No. 638,331. Patented Dec. 5, 1899.
W. W. GRANT.
MOTOR VEHICLE.
(Application filed July 26, 1898.)
(No Model.) 5 Sheets—Sheet 1.
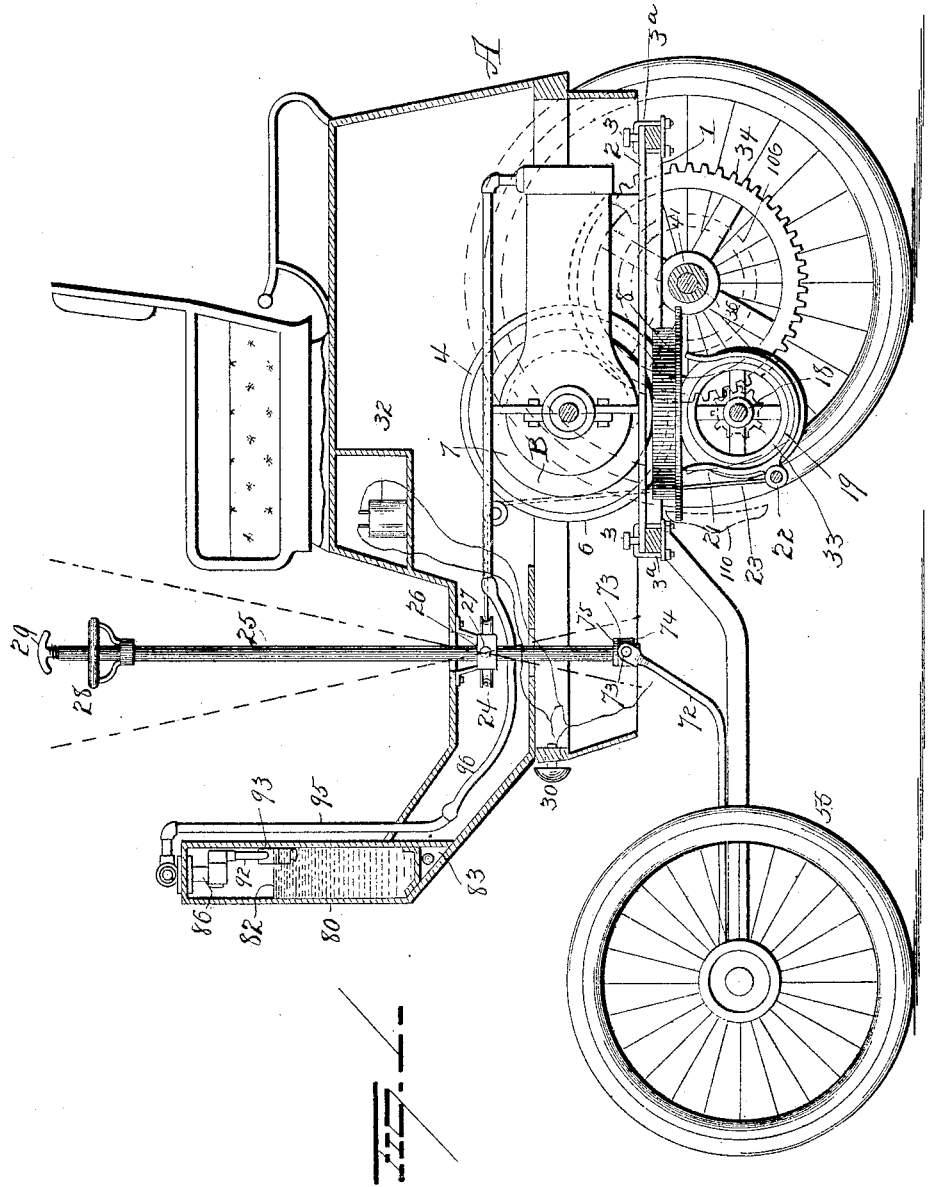
WITNESSES
E. J. Nottingham
G. F. Downing
INVENTOR
W. W. Grant
By H. A. Seymour
Attorney No. 638,331. Patented Dec. 5, 1899.
W. W. GRANT.
MOTOR VEHICLE.
(Application filed July 26, 1898.)
(No Model.) 5 Sheets—Sheet 2.
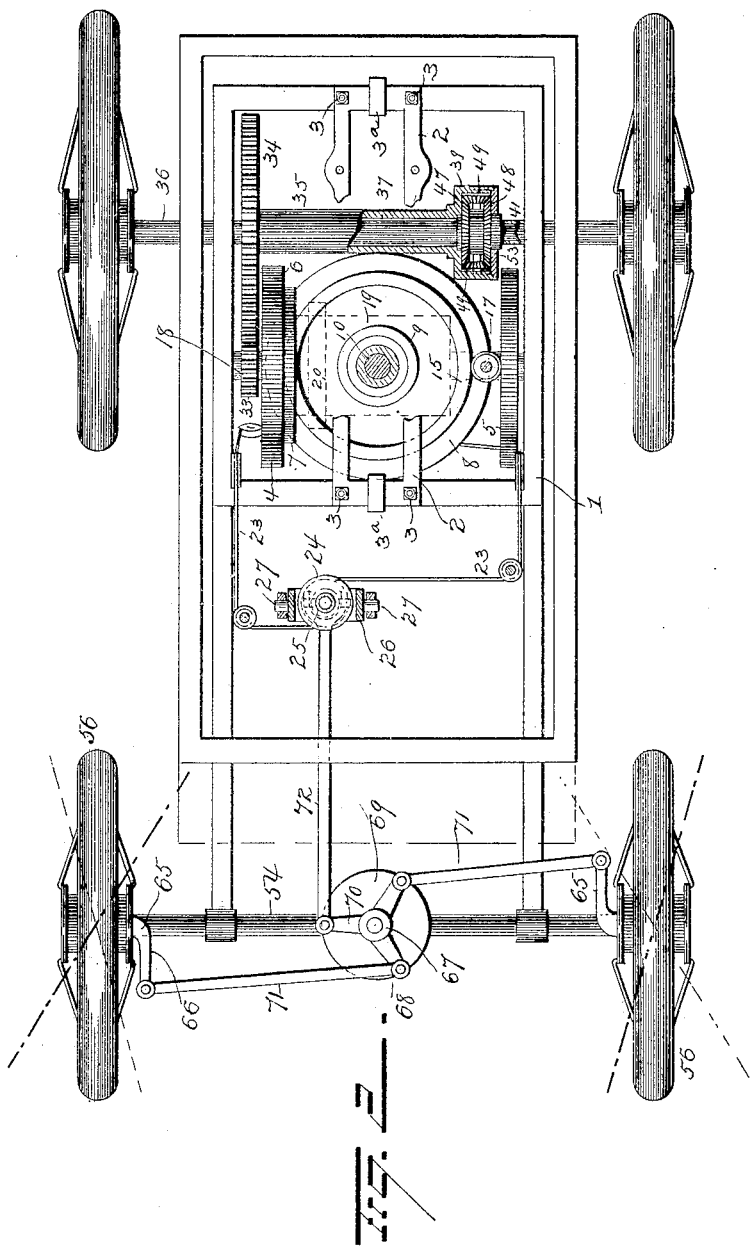
WITNESSES
E. D. Nottingham
G. F. Downing
INVENTOR
W. W. Grant
By H. A. Seymour
Attorney

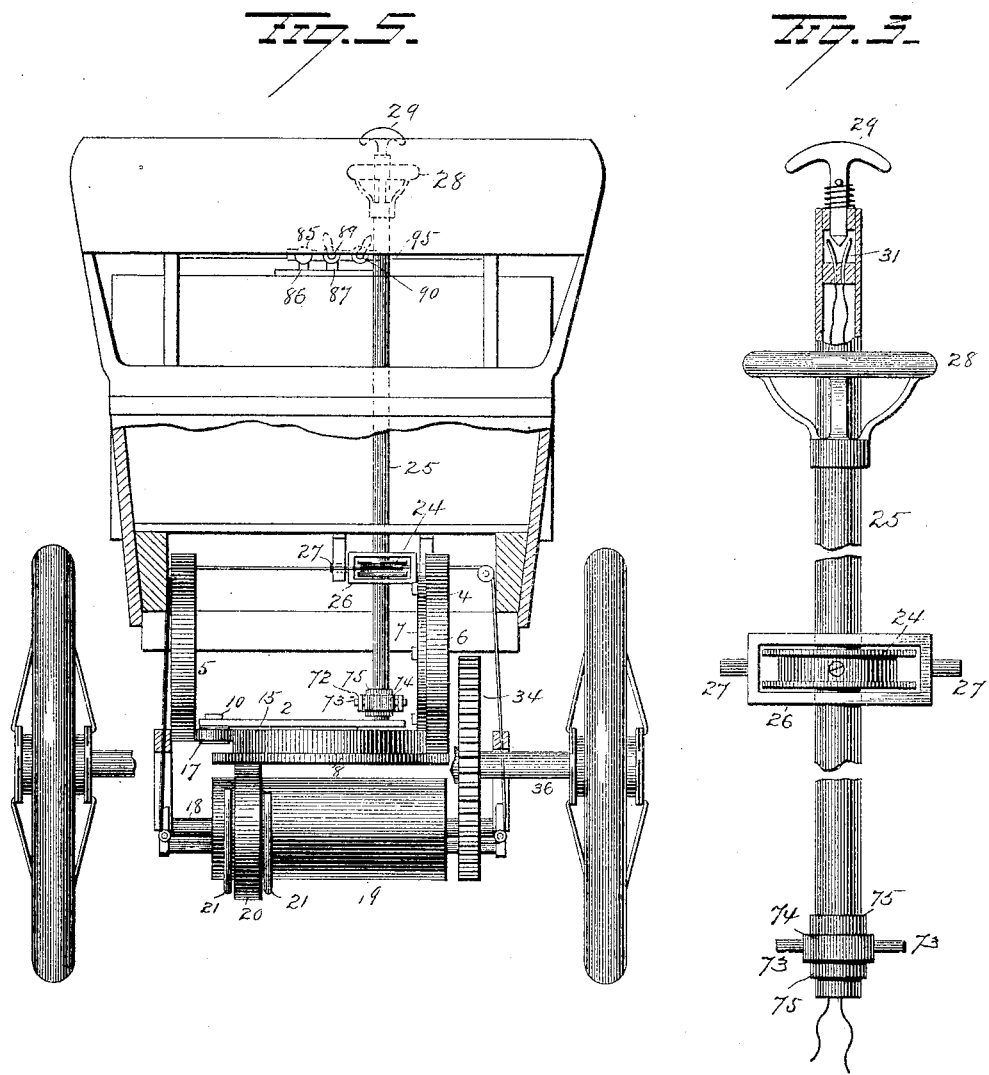

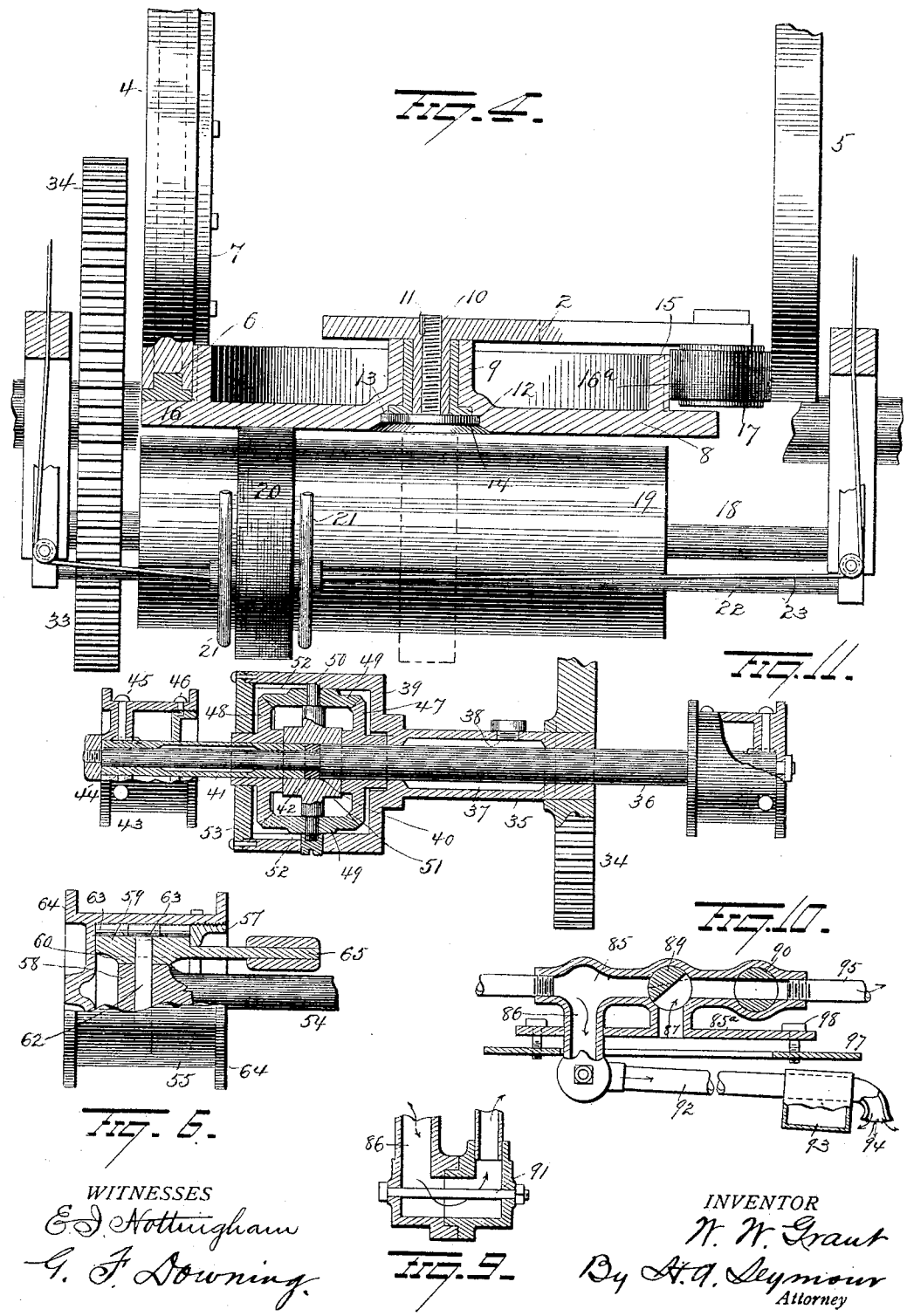

No. 638,331. Patented Dec. 5, 1899.
W. W. GRANT.
MOTOR VEHICLE.
(Application filed July 26, 1898.)
(No Model.) 5 Sheets—Sheet 5.
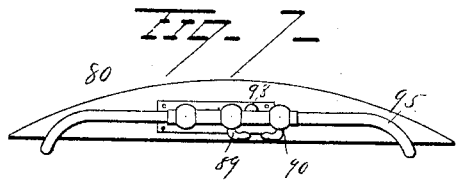
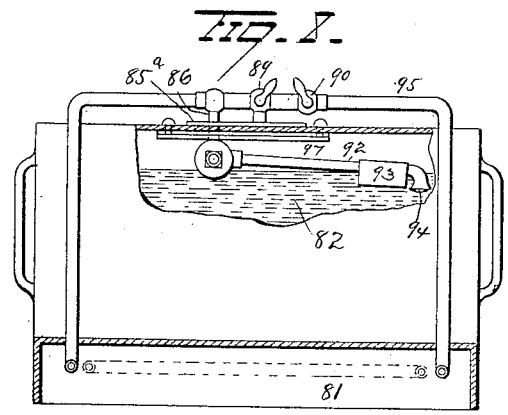
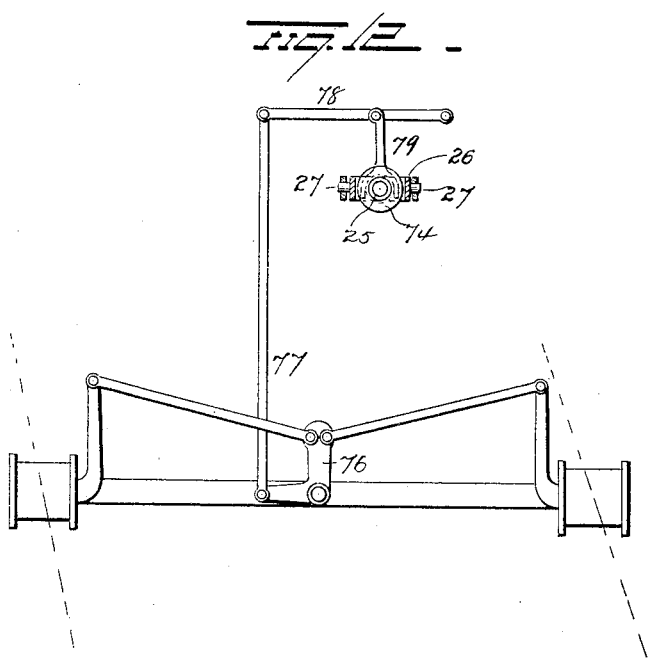
WITNESSES
E. S. Nottingham
G. F. Downing
INVENTOR
W. W. Grant
By H. A. Seymour
Attorney
THE NORRIS PETERS CO., PHOTO-LITHO., WASHINGTON, D. C.

UNITED STATES PATENT OFFICE.

WILLIAM WALLACE GRANT, OF NEW YORK, N. Y.

MOTOR-VEHICLE.

SPECIFICATION forming part of Letters Patent No. 638,331, dated December 5, 1899.

Application filed July 26, 1898. Serial No. 686,937. (No model.)

*To all whom it may concern:*

Be it known that I, WILLIAM WALLACE GRANT, of New York, (Brooklyn,) in the county of Kings and State of New York, have invented certain new and useful Improvements in Motor-Vehicles; and I do hereby declare the following to be a full, clear, and exact description of the invention, such as will enable others skilled in the art to which it appertains to make and use the same.

My invention relates to an improvement in motor-vehicles, the object of the invention being to provide simple and efficient means for transmitting and for regulating the transmission of power from a motor to the driving-wheels of the vehicle; to provide for the easy control of the speed and direction of the vehicle; to provide simple means whereby to differentiate or vary the angles taken by the steering-wheels relatively to each other; to provide differential gearing which shall possess the qualities of safety and strength; to provide for proportioning the elements of a charge with which to operate the motor and controlling the same, whereby to effect variable speeds in the running of the vehicle; to provide a motor-vehicle with a gas-motor; to provide a construction of steering - wheel which shall insure the easy and safe steering of the vehicle, and to so construct a motor-vehicle that the mechanism shall be comparatively noiseless when in operation and so that various parts of said mechanism can be readily adjusted relatively to each other.

With these objects in view the invention consists in certain novel features of construction and combinations and arrangement of parts, as hereinafter set forth, and pointed out in the claims.

In the accompanying drawings, Figure 1 is a side elevation of a vehicle, partly in section, showing my improvements. Fig. 2 is a plan view with parts removed. Fig. 3 is an enlarged view of the controller for regulating the direction and speed of the vehicle and operating the gong. Fig. 4 is an enlarged transverse section showing the gearing whereby motion is transmitted from the motor to the driving-axle. Fig. 5 is a rear end view of the apparatus, partly in section. Fig. 6 is a detail view showing the construction of hub of one of the steering-wheels and its connection with the axle. Figs. 7, 8, 9, and 10 are views illustrating the carbureter, dashboard, and controller appliances. Fig. 11 is a detail view showing gearing of the driving-axle. Fig. 12 is a view of a modification of a portion of the steering appliances. Fig. 13 illustrates the brake devices.

A represents the body of a vehicle constructed with a hollow forward or dashboard portion 80 to operate as a controlling-carbureter, as more fully hereinafter described. Under the body portion A the gear-frame 1 is located. Above the gear-frame the motor-frame 2 is located. This frame may be constructed integral with the motor or separate therefrom. In order to permit the motor-frame and the motor B thereon to be properly adjusted and leveled, said motor-frame is supported over the gear-frame 1 by means of set-screws 3 at the corners of said frame 2. When the frame 2 shall have been properly adjusted, it will be secured in position by means of clips $3^a$.

While I have shown in the drawings a motor to be operated by gas and while I prefer to use such a motor and have shown means mounted on the vehicle for supplying the motive power, still other forms of motors might be used for driving the vehicle.

Two wheels 4 5 are secured to the motor-shaft and arranged parallel with each other, said wheels constituting fly-wheels for the motor and at the same time serving to transmit motion therefrom. The wheel 4 is made in its periphery with a groove for the reception of a peripheral shoe 6, of leather or other frictional material, and to one face of said wheel a ring or plate 7, of frictional material, (of less diameter than that of the wheel,) is secured. A friction-wheel 8 is disposed in a horizontal position under the motor-frame 2 and provided centrally with a hollow boss or hub 9 for the reception of suitable bushing and for the passage of a screw 10. The screw 10 is locked at its upper end in a hole in the frame 2 by means of a key 11 and is provided at its lower end with a large head 12, seated in a countersunk portion 13 in the center of the friction-wheel 8, said countersunk portion being of such depth as to leave a space under the head of the screw whereby to form a recess 14 in the under face of the friction-wheel at the center thereof. The friction-wheel 8 is also provided with an upwardly-projecting annular flange 15 near its periphery. The peripheral shoe 6 of wheel 4 has frictional contact with the upper face of the peripheral portion 16 of wheel or disk 8, and the periphery of the ring or plate 7 on wheel 4 has frictional contact with the top face of the annular flange 15. By this construction and arrangement of parts motion will be transmitted from the wheel 4 to the wheel or disk 8 and the running of one of said wheels on the other will tend to be noiseless. The diameter of the wheel or disk 8 is appreciably less than the space between the wheels 4 and 5, and between the annular flange 15 of wheel or disk 8 and the side face of the wheel 5 an idler 17 is disposed. The idler is preferably made of rubber or other frictional material (or a wheel covered with such material) and is suitably mounted on a stud depending from the frame 2. Thus the wheel 5 and idler 17 will coöperate with the wheel 4 in imparting motion to the friction wheel or disk 8. The peripheral flanges of the wheel or disk 8 may also be faced with frictional material, if desired. The face 16 and the peripheral face of flange 15 may be faced with frictional material when so preferred, whereupon the shoe 6 of wheel 4 may be omitted.

A shaft 18 is mounted in suitable bearings supported by hangers depending from the frame 1, and to this shaft a drum 19 is secured so as to be disposed beneath and parallel with the under face of friction wheel or disk 8 and a short distance therefrom. A comparatively narrow strap 20, of frictional material, encircles the drum and is adapted to bear against the under face of wheel or disk 8, thus forming a frictional connection between the drum 19 and said wheel or disk, whereby motion will be transmitted from the latter to the former. The relation between the drum 19 and friction wheel or disk 8 can be readily adjusted and regulated by raising or lowering the frame 2, on which the friction-wheel is mounted, by means of the set-screws 3. A shipper 21 loosely embraces the drum 19 at respective sides of the strap 20 for the purpose of shifting the latter on the drum, and thus regulating the speed of the drum and of the vehicle, with driving-wheels of which said drum is connected.

It will be readily seen that when the strap 20 is disposed to one side of the center of the friction wheel or disk 8 the drum 19 and the vehicle will be driven forwardly, and when said strap is disposed on the drum to the other side of the center of the wheel or disk 8 said drum and the vehicle will be driven rearwardly, the speed of the drum, and consequently the vehicle, being in either case regulated by the distance of the strap from the center of the friction wheel or disk 8. It will also be observed that when the strap is disposed under the recess 14 in the center of the wheel or disk 8 no motion will be transmitted to the drum and the vehicle can be stopped by shifting the strap 20 to this position. Speed regulation is still further augmented by operation of the dash board-controller, through which speed of the motor is controlled.

The shipper 21 is mounted to slide on a rod or shaft 22, and to the respective sides or ends of said shipper cords or straps 23 are attached. The cords or straps pass over pulleys suitably disposed, and at their free forward ends are wound on a drum 24. The drum 24 is secured to a tubular lever 25, disposed in front of the seat of the vehicle and within convenient reach of the rider. A frame or cage 26 is mounted on the lever 25 and incloses the drum 24, said drum being provided with a set-screw for making it secure and rigid upon and with the lever 25. The frame or cage 26 is provided at diametrically opposite points with trunnions 27, by means of which the lever is pivotally supported above its lower end in the vehicle. The lever 25 is provided with a hand-wheel 28, by means of which to turn it, whereby to wind one of the cords on the drum 24 and unwind the other cord therefrom, and thus effect a movement of the shipper 21 in one direction or the other. Thus it will be seen that by means of the lever 25 the speed and direction of travel of the vehicle, as well as the starting and stopping thereof, can be readily and accurately controlled by the rider. The lever 25 may also be utilized for the reception of a push-button 29, by means of which to control an electric gong 30. The push-button is made with a shank to enter the upper end of the hollow lever and pass between contact-springs 31, said contact-springs being included in circuit with the gong 30 and a battery 32, the latter being located in a box or casing under the seat or other convenient location upon the vehicle.

The shaft 18, on which the drum 19 is mounted, is provided at one end with a gear-wheel 33, adapted to mesh with and transmit motion to a gear-wheel 34. The gear-wheel 34 is secured on one end of a sleeve 35, through which the rear driving-axle 36 of the vehicle passes. The sleeve has bearings at its ends on said axle, and the space intermediate of said bearings forms an oil-chamber 37, into which lubricant can be inserted through a capped inlet 38. The inner end of the sleeve 35 is made integral with one end of a housing 39 and adapted to inclose differential gearing. One end of the axle 36 is contracted in diameter, the shoulder 40 thus formed being located at or near the center of the housing. A sleeve 41 is mounted on the contracted portion of the axle and may have an end-thrust bearing against the shoulder 40; but I prefer to interpose a washer 42 between the end of said sleeve and shoulder. The hub 43 of one of the rear driving-wheels is secured to the outer end of sleeve 41, and the end of the axle is provided with a nut 44. The hub is also provided with keys or set-screws 45 to enter suitable holes in the sleeve 41. The inner head of said hub is adapted to fit or screw thereinto and is prevented from any possibility of escape or from becoming loose by means of keys or set-screws 46. The hub of the other rear driving-wheel is constructed in a similar manner and attached to the opposite end of the axle. If desired, the axle 36 could be made of uniform diameter throughout; but in order that said axle shall present a uniform external appearance the exterior face of the sleeve 41 should aline with the exterior face of the larger portion of the axle, and for this reason I prefer to contract that portion of the axle on which said sleeve is located, as above explained.

A beveled pinion 47 is secured on the axle 36, (within the housing,) and a similar pinion 48 is secured to the sleeve 41. Two other pinions 49 49 are disposed between the pinions 47 48 and mesh with them. The pinions 49 are mounted on shouldered pintles 50, projecting from a collar 51, mounted on the axle 36 and sleeve 41 at the abutting ends thereof. The ends of the pintles 50 have bearings in grooves 52 made in the inner peripheral wall of the housing, the inner sides of said grooves forming shoulders which receive the thrust of said pintles. By the provision of the grooves 52 the collar 51, pintles 50, and pinions 49 can be readily inserted within the housing, the latter being then closed by an end plate 53, having a central hole for the accommodation of the hub of pinion 48. The outer ends of one or both the pintles may be threaded, and about the inner ends of the grooves 52 the peripheral wall may be drilled or tapped for the passage of a cap or nut to be secured upon end of pintle, thus providing a greater and stronger side-thrust bearing through the thus-lengthened pintles.

The front axle 54 of the vehicle is rigidly secured to the framework, and the hubs 55 of the front steering-wheels are mounted to revolve at the respective ends of said front axle and to be pivotally connected therewith. One head of each hub 55 may be made integral with the peripheral portion thereof, and the other head 57 is preferably screwed therein and secured by suitable set-screws.

The front axle is provided at its ends with heads 58, and encircling each head is a collar 59, having inwardly-projecting bosses 60 at diametrically opposite points. These bosses are provided with passages 61 for the reception of pins 62, passing through the head 58 of the axle, and thus the hubs of the steering-wheels are pivotally connected with the ends of the front axle. One end of the collar 59 has a bearing against the fixed head of the hub and its other end has a bearing against the removable head or ring 57. Within the annular space between the peripheral wall of the hub and the collar 59 antifriction-rollers 63 are disposed and prevented from endwise displacement by the heads of the hub. Each hub is provided with peripheral flanges 64, to which the spokes of the wheels are secured. Each collar 59 is provided with L-shaped levers 65, the arms 66 of which project normally at right angles to the axle and in opposite directions therefrom.

A lever 67 is pivotally mounted on the front axle centrally between the ends thereof, and may consist of a disk having three points of attachment for links or a disk having three strengthening-ribs, or it may consist merely of three arms 68, 69, and 70, integral with each other and pivotally supported at a common point on the axle.

The arms 68 and 69 are connected with the L-shaped levers 65 by means of links 71. It will be observed that the arms 68 and 69 of lever 67 project laterally from their pivotal connection with the axle and also laterally with respect to the longitudinal axis of the vehicle. In other words, the two arms 68 69 form an obtuse angle, and each arm forms, with the axle, an acute angle, and the arms 66 are of such length as to cause the ends of the links 71 connecting upon the arms 66 to be farther away from the axle 54 than are those ends of the links connecting upon the arms 68 and 69, thus throwing the links 71 out of parallel with the axle. From this construction and arrangement of parts it will be seen that when the lever 67 is turned one of the steering-wheels will be turned farther on its pivotal support than the other, so as to facilitate the turning of the vehicle, the wheel which marks the inner curve on which the vehicle turns being disposed at a different angle to the axle than the wheel which marks the outer curve. For instance, suppose that the lever-arm 70 be caused to move inwardly toward the vehicle-body until lever-arm 69 and its connecting-link 71 aline. Thereupon the hub connected therewith will swing or turn through a less distance than the other hub, which has connection with arm 68, because the link 71 connecting with arm 68 will move through a greater distance longitudinally than will the link connecting the arm 69, and so when the arm 70 is moved outwardly in a direction away from the vehicle-body the link connecting with arm 68 will move through a shorter distance than will the link connecting upon arm 69. Hence the wheel connecting with arm 68 will turn or swing a less distance than will the wheel connecting with arm 69. The arm 70 of lever 67 is connected by means of a link 72 with trunnions 73, projecting from a collar 74, mounted to rotate on the lower end of the controller-lever 25, said collar 74 being prevented from displacement by means of fixed collars 75. Thus it will be seen that by moving the lever forwardly or rearwardly on its intermediate trunnions the hubs of the steering-wheels will be turned on their pivotal connections with the front axle and the vehicle can be accurately and easily guided and controlled.

By the arrangement shown in Fig. 6 the steering-sleeve is designed to swing laterally while other parts of the wheel are adapted to revolve above it, thus making steering easy and making obstacles in the path of the wheels less to be apprehended than would a construction of wheel pivoted to swing outside of the hub.

Instead of employing the three-armed lever 67 as a portion of the steering mechanism a simple bell-crank lever 76, Fig. 12, may be employed. With this construction both links 71 are connected to one arm of lever 76, and to the other arm of said lever a link 77 is attached. The rear end of link 77 is pivotally connected with a pivoted lever 78. A link 79 is pivoted at one end to lever 78 and at its other end is bifurcated for attachment to the collar 74 on lever 25.

I have arranged and provided my dashboard with means to aid in effecting scope of speed variation whereunder to run the vehicle and to effect a properly-vaporized charge for development of energy within the motor. For the latter purpose hydrocarbon, oxyhydrocarbon, or such other material may be employed within this dashboard-tank as will provide the character of vapor required with air or gas to effect the necessary quality of charge for the motor.

The form of the tank 80 may be such as occasion requires and may have piping 81, Fig. 8, interiorly disposed about its bottom, the ends whereof projecting from without the tank and upon which to make proper connections for circulating through such piping or condenser heated water, hot air, steam, or exhaust gases, whereby to furnish heat to the material 82 contained in the tank for that heat lost to the material through evaporation. I prefer to have the tank, however, provided about its bottom with a separate compartment 83, Fig. 1, for the circulation required to furnish heat to the liquid contained in the tank. Opening into compartment 83 may be made at any desirable point to effect communication between its interior and the source of heat-supply.

For the conduct of air or gas into the tank and the proper proportioning of vapor therewith I have provided in immediate reach and control of the operator the arrangement shown in section in Fig. 10, consisting of a plate upon which is formed a longitudinal passage 85, from which branch two vertical or downwardly-disposed passages 86 and 87. Obviously these passages may be effected through fittings or may be formed in a casting. At the angle or conjunction formed by one end of passage 87 with passage 85 there is disposed a valve-plug 89, and to one side thereof, upon the passage 85, is disposed another valve-plug 90. About one end of passage 86 is a swinging joint provided to have one of its parts free to move, and is shown in section in Fig. 9 as having two faces recessed or shouldered, respectively, and having these faces brought together to form a working and an air-tight joint. A bolt 91 passes through their axial center and is furnished with a nut to secure the parts together and permitting one-half of the joint to oscillate or swing. To the moving part of the joint is secured a length of pipe 92, upon which is contained a float 93, Figs. 1, 8, and 10. That end of the pipe opposite that end secured in the joint is closed and perforated, or provided with a rose 94, so that air emerging therefrom may issue in a finely-divided form or as a spray of air or gas, as it were. The float is so adjusted as to permit the perforated or discharge end of the pipe 92 to dip as far below the surface level of the liquid in tank 80 as may be required. Thereupon the pipe 92 will be caused to oscillate or swing as change in the level of material 82 transpires and will keep the perforated end of pipe 92 immersed.

Connecting with an end of the passage 85 is a pipe 95, Figs. 1, 8, and 10, which communicates with the motor B, Fig. 1, being intersected, however, by a flexible tube 96, whereby to compensate for variation of vibration between the carriage-body carrying tank 80 and the running-gear carrying motor B.

The carbureting and proportioning of air or gas to effect a motor charge transpire as follows, the arrows indicating direction of the travel of the charge: The motor operating serves by suction of the piston to draw air or gas from whatever source through the inlet-pipe, Figs. 1, 7, 8, and 10, through passage 85 and swinging joint, thence through pipe 92 and its perforated end into the liquid 82, thence out through passage 87 and valve-plugs 89 and 90 into pipe 95, and thence into the engine; but as the charge to the engine may thus be overcarbureted or contain too much vapor from the liquid 82 the proper proportion of air or gas to obviate this is provided through the operation of valve-plug 89 as follows: By turning this plug 89 so that it will stand as indicated by the dotted lines, Fig. 10, all of the indrawing air or gas from the inlet-pipe will not pass down through passage 86, but instead some of it will pass down passage 86 and some of it will pass through the passage 85 and by the slightly-opened valve 89 to meet the vaporized charge rising through 87, which it will combine with and serve to dilute to the degree required, this degree of dilution being effected, of course, by the degree through which valve-plug 89 is opened, either by opening it as indicated by dotted lines in Fig. 10 or opening more than indicated or less than indicated by the said dotted lines.

The valve-plug 90, Fig. 10, is designed to regulate the volume of charge that may be permitted to pass from the carbureting mechanism to the motor, and thereby is adapted to control the speed of the motor, and thus by controlling the speed of the motor being enabled to increase the variable speeds in running the vehicle. Thus when full open, as shown, the passage for full or maximum charge is provided for. When partly closed, as indicated by the dotted lines, the tendency is to reduce the maximum or full volume of the charge, and as the valve-plug is continued to be turned in the direction of its closing the volume of charge may be reduced and speed of the motor checked. By completely closing of this valve the motor may be stopped. Through this arrangement of mechanism, together with the belt-shifting mechanism, the operator is doubly provided for effecting the speed control of the vehicle, as by not having the motor speed within his control he could develop only such speeds as manipulation of the shifting device would effect; but when added to this he has the speed of his motor under control he is enabled to effect a minimum or maximum motor speed or some relation of motor speed between these two extremes. This variable speed secured through his motor is again converted through the transmission device to a variable speed in the vehicle having a ratio to that of the motor. Also by this arrangement economy of operation is effected—as, for instance, by developing a slow speed upon his motor he will not consume so much fuel as at a higher speed, but at the same time may increase his vehicle speed by manipulation of the transmission-belt up to a point where he will consume all of the power given out by his motor at its lower speed, &c., whereas when relying upon an invariable speed of his motor his consumption of fuel as proportionately continues whether he speed the vehicle fast or slow. Stoppage of the motor may also be effected when the valve-plug 90 is left wide open, as shown, and turning valve-plug 89 so that it will completely close passage 87, whereupon air or gas will charge to the motor without becoming carbureted.

The plate 85ª has a companion plate 97, Fig. 10. This plate 97 is provided to be secured upon and inside the tank. An opening is provided upon this plate and upon the tank to admit passage of the swinging joint and appendages on plate 85ª into the tank, whereupon plate 85ª is brought down upon tank, and being juxtaposed over plate 97 is drawn down tight by bolts 98, passing through plate 85ª into bolt-holes tapped in plate 97 to receive them. Thus the edges of the wall of the tank at this point are tightly clamped between the two plates 85ª and 97, which become thereby rigid with the tank and furnish at same time an air-tight joint, gaskets being interposed properly and in well-understood manner to better effect freedom from leakage. Access to interior of tank may be had by unbolting and lifting plate 85ª away. Plate 85ª is also provided with an opening (fitted with a plug 88, Fig. 7) through which to fill or view interior of tank, &c.

Having fully described my invention, what I claim as new, and desire to secure by Letters Patent, is—

1. In a motor-vehicle, the combination with a frame and driving-wheels, of a motor mounted on the frame; a friction wheel or disk; friction-wheels connected with the motor and adapted to transmit motion to said disk; a drum disposed in proximity to the face of said friction wheel or disk; a strap on said drum adapted to bear against the friction wheel or disk; means for shifting said strap on the drum, and gearing between said drum and driving-wheels, substantially as set forth.

2. In a motor-vehicle, the combination with a frame and driving-wheels, of a friction wheel or disk having a recess centrally in its under face; means for transmitting motion from the motor to said friction wheel or disk; a drum disposed in proximity to said wheel or disk; a strap on said drum adapted to bear against said wheel or disk; means for shifting the strap on the drum; and means for transmitting motion from the drum to the driving-wheels, substantially as set forth.

3. In a motor-vehicle, the combination with a frame, driving-wheels and a motor, of friction-wheels connected with the motor; a friction-disk disposed between said friction-wheels and adapted to receive motion from one of them; a friction-roller disposed between the other friction-wheel and said friction-disk and means for transmitting motion from said friction-disk to the driving-wheels, substantially as set forth.

4. In a motor-vehicle, the combination with a frame, a motor thereon and driving-wheels, of friction-wheels connected with the motor; a frictional shoe secured to the periphery of one of said friction-wheels; a friction-ring also secured to one face of said friction-wheel; a friction-disk against which said shoe runs; an annular flange on which said friction-ring runs; a friction-roller disposed between said annular flange and the other friction-wheel, and means for transmitting motion from the friction-disk to the driving-wheels, substantially as set forth.

5. In a motor-vehicle the combination with the body and drive-wheels, of a frame; a friction-disk carried by said frame; a drum; means for transmitting motion from the friction-disk to the drum; means for adjusting said frame vertically; a motor adapted to transmit motion to the friction-disk and gearing between the drum and driving-wheels, substantially as set forth.

6. The combination in a vehicle, of a body; a driving-axle; a wheel secured to one end thereof; a sleeve mounted loosely on said axle; a wheel secured to said sleeve; a housing provided with a sleeve mounted on the axle; nuts at the ends of axle; means for transmitting motion to said last-mentioned sleeve; pinions on said axle and first-mentioned sleeve; and pinions mounted within the housing and meshing with said first-mentioned pinions, substantially as set forth.

7. The combination with an axle and a driving-wheel thereof, of a housing provided with a sleeve mounted on the axle, means for transmitting motion to said sleeve, another sleeve mounted on the axle and carrying the other driving-wheel, a pinion secured to said last-mentioned sleeve, a pinion secured to the axle; nut at end of axle; a collar disposed on the axle between said pinions, pintles projecting from said collar and having bearings in the housing, and pinions on said pintles meshing with said first-mentioned pinions, substantially as set forth.

8. The combination in a vehicle, of an axle consisting of one continuous piece and having a wheel secured to one of its ends, two sleeves mounted on said axle, one of said sleeves provided with a drive-wheel and with a gear-wheel, the other sleeve provided with a housing and with a gear-wheel, a gear-wheel secured to the axle, a pintled collar carried loose upon the axle, pinions loosely carried upon the pintles of said collar and meshing with the gear-wheel on the axle and with a gear-wheel secured to one of said sleeves, and bearings provided upon the housing for engagement with the ends of the pintles upon the loose collar.

9. The combination with a revoluble device, of a wheel secured thereon; said wheel having a hub with one of its ends closed and integral with the body of the hub; its other end closed with a threaded removable head; screws to prevent movement of said removable head; the closed integral end of said hub pierced for the passage of a shaft, and means for securing said wheel-hub upon the revoluble device.

10. In a motor-vehicle, the combination with a frame, driving-wheels and a motor, of gearing between the motor and driving-wheels; a shifting device for controlling the speed and starting and stopping of the vehicle; steering devices; a revoluble lever pivotally supported between its ends; a drum secured to said lever coincident with the pivotal support thereof; a cord connected with the shifting device and adapted to wind on said drum; and a swiveled connection between said lever and steering devices, substantially as set forth.

11. The combination with an axle, of a collar pivotally connected upon the end of said axle; a wheel having its hub embrace said collar; an end of said hub provided with a removable ring, said ring screw-threaded about its periphery for engagement with a corresponding thread upon the hub; means for further securing said ring against displacement, and for turning the collar upon its pivotal connection with the axle.

12. The combination in a vehicle, of a fixed axle, wheel-hubs pivotally connected with the ends of said axle; end of wheel-hub provided with a removable ring threaded about its periphery and engaging with a thread upon the hub, thereby enabling it to secure hub against unnecessary lateral movement and escape from its pivotal support, arms projecting from the wheel-hub supports and through the removable ring of above reference, means for connecting said arms and for operating the pivotally-supported wheels for steering, substantially as set forth.

13. In a motor-vehicle, a hollow dashboard serving also as a tank, means for heating material within said hollow dashboard, and means for causing vapor of said material to mingle, mix, and compound (within said hollow dashboard), with other material passed into the hollow dashboard for such purpose and to effect an energy charge for operating a motor.

14. The combination with a tank containing carbureting material and a motor, of a tubular arm having one end immersed in said carbureting material, an inlet-pipe for fluid communicating with said tubular arm, a pipe connecting the tank with the motor and a valve in said last-mentioned pipe, substantially as set forth.

15. The combination with a tank containing carbureting material and a motor, of a pivoted tubular arm having one end immersed in said carbureting material, an inlet-pipe for fluid communicating with said tubular arm, a pipe connecting the tank with the motor and a valve in said last-mentioned pipe, substantially as set forth.

16. The combination with a motor and a tank containing carbureting material, of a pivoted tubular arm having its discharge end immersed in said carbureting material, an inlet-pipe for fluid communicating with said tubular arm, means for heating the tank, a pipe connecting the tank with the motor and a valve in said last-mentioned pipe, substantially as set forth.

17. The combination with a motor and a tank containing carbureting material, of a valved pipe connecting said tank and motor, a pivoted tubular arm for injecting fluid into said carbureting material, said tubular arm having a jet-outlet immersed in said carbureting material, and a float on said tubular arm, substantially as set forth.

18. The combination with a tank containing carbureting material, and a motor, of a pipe communicating at one end with the motor and at the other end with a fluid-supply, a pivoted tubular arm communicating with a branch of said pipe and adapted to discharge into the carbureting material, a connection between said pipe and the tank, a valve in said connection and a valve in said pipe between the said valved connection with the tank and the motor, substantially as set forth.

19. In a motor-vehicle, the combination with steering and driving mechanism, of a steering-lever adapted to operate pivotally and revolubly, a pulley rigidly secured to said lever and connected with the driving mechanism, a trunnioned frame loosely carried upon the lever and about the rigidly-secured pulley, bearings upon which to engage trunnions of said frame, a collar swiveled on the lower end of said lever and connected with the steering mechanism.

20. In a motor-vehicle, the combination with a steering-lever adapted to operate pivotally and revolubly, of a loose collar thereon, a trunnioned frame loosely mounted upon the steering-lever and about a pulley rigidly secured upon said lever, bearings upon which to engage trunnions of said frame, and mechanism carried upon the lever to operate an electric device.

21. In a motor-vehicle, a controller for effecting speed variation and direction of the vehicle, and for signaling, consisting of a lever having thereupon secured a hand-wheel, electric push-button mechanism, a loosely-mounted trunnion-frame; a pulley within said frame rigidly secured upon the lever, a loose collar, bearings upon which to support controller, and connections engaging controller with the mechanism to be operated by it.

22. In a motor-vehicle, the combination with a gear-frame, motor and traction-wheels, of four subsidiary wheels in frictional engagement, one upon another of the four, three of the subsidiary wheels operating to give power into the fourth subsidiary wheel, and a drum and gear, to be driven by power transmitted from the fourth subsidiary wheel.

23. In a motor-vehicle, the combination with a motor, gear-frame and traction-wheels, of four subsidiary wheels having a correlative frictional engagement—one upon another throughout the four; two of the subsidiary wheels disposed at right angles to the other two wheels; and one of the subsidiary wheels receiving power proceeding from the motor through the other three of the wheels, a drum, a gear engaging with driving-gear upon the driving-axle, and means for transmitting power from a subsidiary wheel to drive the drum and gear, and therewith, the traction-wheels of the vehicle.

24. In a motor-vehicle, the combination with a frame, motor, and traction-wheels, of four wheels operating together for transmission of power, each of the four wheels having frictional engagement with the next adjoining of the four, one of said wheels flanged, another of said wheels provided as an idler, of the two remaining wheels, one operating through engagement with the flanged wheel, the remaining of the four wheels operating upon the flanged wheel, through the intervened idler-wheel.

25. In a motor-vehicle, the combination with a motor, frame, and driving-wheels, of friction-wheels connected with the motor; one of said friction-wheels being stepped, another frictional wheel stepped to relatively correspond with the stepped wheel first named, thereby presenting a number of faces upon the respective wheels, for frictional engagement therebetween, a frictional roller disposed to have frictional engagement with one of the stepped wheels and with a friction-wheel connected with the motor, and means for transmitting motion from the frictional wheels to the driving-wheels of the vehicle.

26. In a motor-vehicle, the combination with a motor for driving the vehicle, of a generator-dashboard having thereupon provided, a device for effecting and proportioning within the dashboard a gaseous charge for the motor, and a passage establishing communication between the interior of the dashboard and the interior of the motor.

27. In a motor-vehicle, the combination with a motor for development of energy for driving the vehicle, of a tank having communication with the interior of the motor, and having thereupon provided, a valved device for effecting within the tank, the gaseous charge for the motor, and for controlling quality and quantity of gaseous charge for the motor.

28. In a motor-vehicle, the combination with a motor, of a tank having a detachable plate, a passage upon said plate, valve-plugs mounted upon said passage, other passages branching from the first-named passage, and means for operating the valve-plugs whereby to effect control of the passages and thereby, control of the motor.

29. In a motor-vehicle, the combination with a motor for driving the vehicle, of a generator-tank wherewith to effect a charge for driving the motor; and for the purposes thereof, said tank provided with a detachable plate having passages formed thereupon for passage of fluid, valve-plugs for controlling such fluid-passage, a movable pipe depending from a side of said plate and communicating with passage upon interior of plate, and means for securing said plate and its appendages firmly upon generator-tank, and means for effecting communication between interior of generator-tank and interior of motor.

30. In a vehicle, the combination with a sleeve having thereon rigidly secured a drive-wheel and a gear-wheel, of a shaft of one continuous length, and having a gear-wheel and a drive-wheel rigidly secured thereon, said sleeve, a gear-wheel and housing, loosely carried upon the said shaft, a stud, carrying thereon a loosely-mounted gear-wheel meshing with a gear secured upon the sleeve, above named, and with a gear secured upon the said shaft, an end of said stud engaging with the housing, and means for retaining the several named parts in position upon the said shaft.

31. The combination with an axle, of a collar pivotally connected thereto, a hub mounted on said collar, rollers disposed between said collar and hub and a ring secured in said hub and having a bearing against said collar so as to retain the rollers in place and exclude the admission of dust.

In testimony whereof I have signed this specification in the presence of two subscribing witnesses.

WILLIAM WALLACE GRANT.

Witnesses:
HENRY MEYERHOLZ, Jr.,
WILLIAM FERRIS.